(12) United States Patent
Wada et al.

(10) Patent No.: US 9,140,312 B2
(45) Date of Patent: Sep. 22, 2015

(54) HYDRAULIC CONTROL DEVICE FOR HYBRID DRIVE DEVICE

(75) Inventors: Kensuke Wada, Anjo (JP); Yuhei Yoshioka, Anjo (JP); Tetsuya Yamaguchi, Anjo (JP); Daiki Suyama, Okazaki (JP); Yuji Inoue, Nissin (JP); Yukihiko Ideshio, Nissin (JP); Toshihiko Kamiya, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/008,118

(22) PCT Filed: Apr. 27, 2012

(86) PCT No.: PCT/JP2012/061484
§ 371 (c)(1),
(2), (4) Date: Dec. 27, 2013

(87) PCT Pub. No.: WO2012/147971
PCT Pub. Date: Nov. 1, 2012

(65) Prior Publication Data
US 2014/0124324 A1 May 8, 2014

(30) Foreign Application Priority Data

Apr. 28, 2011 (JP) ................................. 2011-100804
Jan. 25, 2012 (JP) ................................. 2012-013548

(51) Int. Cl.
*F16H 61/12* (2010.01)
*F16D 25/12* (2006.01)
(Continued)

(52) U.S. Cl.
CPC ................ *F16D 25/12* (2013.01); *B60K 6/387* (2013.01); *B60K 6/48* (2013.01); *B60W 10/02* (2013.01);
(Continued)

(58) Field of Classification Search
None
See application file for complete search history.

(56) References Cited

U.S. PATENT DOCUMENTS

| 5,288,279 A | 2/1994 | Sakai et al. |
| 5,738,602 A * | 4/1998 | Morita et al. ................. 475/127 |

(Continued)

FOREIGN PATENT DOCUMENTS

| JP | A-62-99215 | 5/1987 |
| JP | U-1-121751 | 8/1989 |
| JP | A-5-133464 | 5/1993 |
| JP | A-2009-35241 | 2/2009 |

OTHER PUBLICATIONS

International Search Report issued in International Patent Application No. PCT/JP2012/061484 dated Jul. 31, 2012.

*Primary Examiner* — Ramya Burgess
*Assistant Examiner* — Mark Manley
(74) *Attorney, Agent, or Firm* — Oliff PLC

(57) ABSTRACT

A hydraulic control device configured with a source pressure generation section, a hydraulic servo for a clutch provided between an engine and a motor, a control solenoid valve that outputs a regulated source pressure to the hydraulic servo, and a switching section that switches a hydraulic passage, which extends between the source pressure generation section and the hydraulic servo to supply the engagement pressure, between a first and second state in which the hydraulic passage has a high conduit resistance compared to the first state at least until the clutch is engaged. The switching section switches the hydraulic passage into the second state during a failure in which the control solenoid valve is de-energized and the source pressure is directly supplied to the hydraulic servo as the engagement pressure, and switches the hydraulic passage into the first state during normal times when the failure does not occur.

9 Claims, 10 Drawing Sheets

(51) Int. Cl.
    *B60K 6/387*    (2007.10)
    *B60K 6/48*     (2007.10)
    *B60W 10/02*    (2006.01)
    *B60W 20/00*    (2006.01)
    *F16D 48/02*    (2006.01)
    *F16D 48/04*    (2006.01)
    *F16D 48/06*    (2006.01)

(52) U.S. Cl.
    CPC .............. *B60W 20/50* (2013.01); *F16D 48/02* (2013.01); *F16D 48/04* (2013.01); *F16D 48/066* (2013.01); *F16H 61/12* (2013.01); *F16D 2048/0209* (2013.01); *F16D 2500/5114* (2013.01); *F16H 2061/1224* (2013.01); *F16H 2061/1264* (2013.01); *F16H 2061/1268* (2013.01); *Y02T 10/6221* (2013.01)

(56) References Cited

U.S. PATENT DOCUMENTS

| | | | | |
|---|---|---|---|---|
| 7,621,837 | B2* | 11/2009 | Sato et al. ...................... | 475/127 |
| 7,648,440 | B2* | 1/2010  | Wu et al. ....................... | 477/180 |
| 8,182,397 | B2* | 5/2012  | Shimizu et al. ............... | 477/127 |
| 2009/0036269 | A1 | 2/2009 | Kim | |

* cited by examiner

F I G . 7
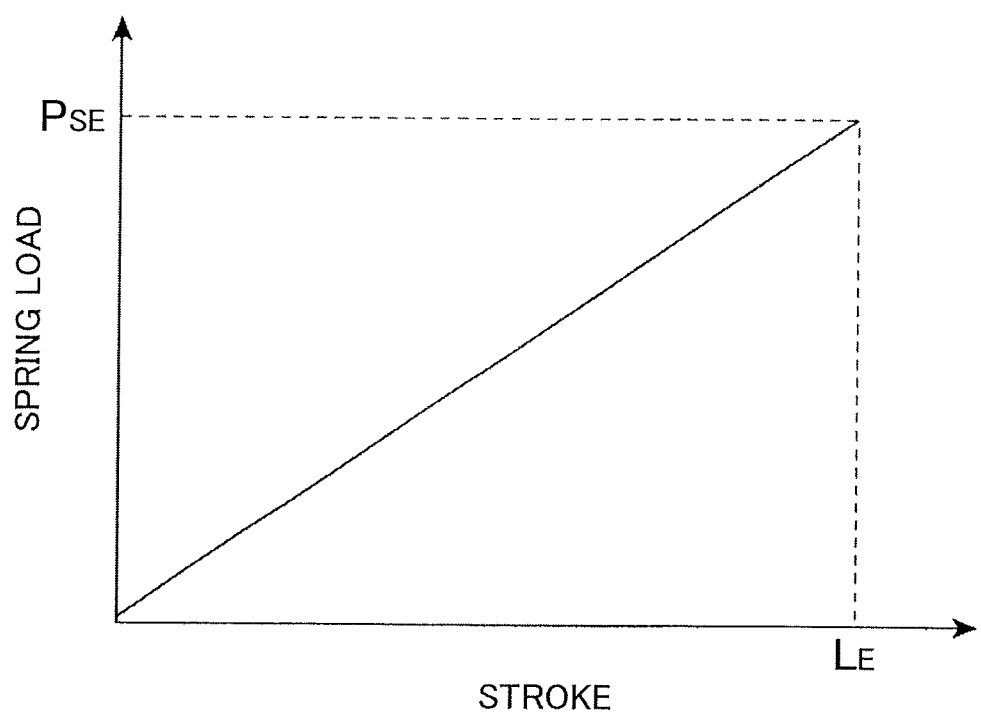

HYDRAULIC CONTROL DEVICE FOR HYBRID DRIVE DEVICE

INCORPORATION BY REFERENCE

The disclosure of Japanese Patent Application No. 2011-100804 filed on Apr. 28, 2011 and Japanese Patent Application No. 2012-013548 filed on Jan. 25, 2012 including the specification, drawings and abstract is incorporated herein by reference in its entirety.

BACKGROUND OF THE INVENTION

The present invention relates to a hydraulic control device for a hybrid drive device in which a clutch is provided on a power transfer path between an engine and a motor provided on a drive wheel side with respect to the engine.

DESCRIPTION OF THE RELATED ART

Increasing environmental awareness etc. in recent years has led to intensive study on hybrid drive devices including an engine and an electric motor as drive sources. Among such hybrid drive devices, in particular, one-motor hybrid drive devices in which an engine and a motor are disposed in series with a clutch provided between the engine and the motor have been drawing attention for their high efficiency.

That is, in the one-motor hybrid drive device, the clutch provided between the engine and the motor can be engaged and disengaged to selectively enable and disable power transfer between the engine and the motor. Consequently, the clutch is disengaged during EV travel and during regeneration to prevent the engine from being rotated in an accompanying manner together with the motor, thereby eliminating an energy loss due to such accompanying rotation of the engine. When the engine is used to travel, meanwhile, the clutch is engaged to transfer power from the engine to drive wheels.

In the one-motor hybrid drive device in which the clutch is provided between the engine and the motor, it may be difficult to secure travel of the vehicle if the clutch cannot be engaged in a situation where motor drive cannot be performed such as a case where a wire breakage occurs in a harness and electric power is not supplied from a battery. Therefore, there has hitherto been devised to provide the hybrid drive device with a limp-home travel function that allows engagement of the clutch even during a failure in which motor drive cannot be performed (see Japanese Patent Application Publication No. 2009-35241 (JP 2009-35241 A)).

Specifically, in the hybrid drive device described in JP 2009-35241 A, a hydraulic circuit that supplies a hydraulic pressure (engine clutch supply pressure) to the clutch (engine clutch) is provided with an engine clutch control valve formed from a normally open (normally high) solenoid valve so that the maximum engagement pressure (engine clutch control pressure) can be supplied to the clutch to engage the clutch even in the case where electric power cannot be supplied to the engine clutch control valve.

SUMMARY OF THE INVENTION

A vibration damper is provided in a portion of the hydraulic circuit connected to a hydraulic servo for the engine clutch to remove pulsation in engagement pressure of the engine clutch. In the case where a failure in which the engine clutch control valve is de-energized occurs, however, the engine clutch control valve is abruptly fully opened by the urging force of a spring, and an engagement pressure is abruptly output to the hydraulic pressure for the engine clutch. Therefore, the damper capacity of the vibration damper which removes pulsation may be too small to absorb the engagement pressure, which may result in abrupt engagement of the engine clutch.

In particular, when the engine clutch is abruptly engaged while the hybrid drive device is performing regeneration and deceleration torque from the engine abruptly acts on a rotary shaft rotating at a high speed, a large engagement shock is caused and deceleration G acts on the vehicle to give an uncomfortable feeling to the driver. The vibration damper is always connected to the hydraulic circuit which supplies a hydraulic pressure to the hydraulic servo for the engine clutch, also during normal times in which no failure occurs. Therefore, for the engine clutch for which a high responsiveness is desired to connect the engine to a drive system, the capacity of the damper may not be increased so that the damper absorbs the engagement pressure to be supplied during the failure.

It is therefore an object of the present invention to provide a hydraulic control device for a hybrid drive device in which a clutch provided between an engine and a motor can be engaged with a small engagement shock even during a failure in which a control solenoid valve is de-energized.

According to an aspect of the present invention, a hydraulic control device for a hybrid drive device includes: a source pressure generation section that generates a source pressure; a hydraulic servo for a clutch provided on a power transfer path between an engine and a motor provided on a drive wheel side with respect to the engine; a control solenoid valve that is electrically controlled so as to output the regulated source pressure to the hydraulic servo for the clutch as an engagement pressure; and a switching section that switches a hydraulic passage, which extends between the source pressure generation section and the hydraulic servo to supply the engagement pressure, between a first state and a second state in which the hydraulic passage has a high conduit resistance compared to that in the first state at least until the clutch is engaged. In the hydraulic control device, the switching section switches the hydraulic passage into the second state during a failure in which the control solenoid valve is de-energized and the source pressure is directly supplied to the hydraulic servo as the engagement pressure, and switches the hydraulic passage into the first state during normal times when the failure does not occur.

According to the aspect of the present invention, when a failure occurs in which the control solenoid valve that controls engagement and disengagement of the clutch provided between the engine and the motor is de-energized, the switching section switches the hydraulic passage from the first state for use during normal times into the second state for use during a failure. Consequently, the conduit resistance of the hydraulic passage is increased at least during engagement of the clutch, and therefore it is possible to relieve a rise in engagement pressure even if the source pressure is directly supplied to the hydraulic servo for the clutch during a failure, thereby occurrence of an engagement shock is suppressed. Thus, deceleration G that acts on the vehicle can be relieved to alleviate an uncomfortable feeling given to the driver.

BRIEF DESCRIPTION OF THE DRAWINGS

FIG. 7 is a graph showing the capacity of a damper according to the fifth embodiment of the present invention;

DETAILED DESCRIPTION OF THE EMBODIMENTS

A hydraulic control device for a hybrid drive device according to an embodiment of the present invention will be described below with reference to the drawings. In the following description, the term "motor" does not mean a motor in the narrow sense that simply serves as a drive motor, but means a motor (motor generator) in the wide sense that can also be used as a generator through regeneration. In order to indicate the position of a spool or a damper, the terms "right-half position" and "left-half position" are used to refer to the respective positions of the right half and the left half of the spool or the damper shown in FIGS. 2 to 6, 9, and 10.

First Embodiment

[Schematic Configuration of Hybrid Drive Device]

Figure 1:
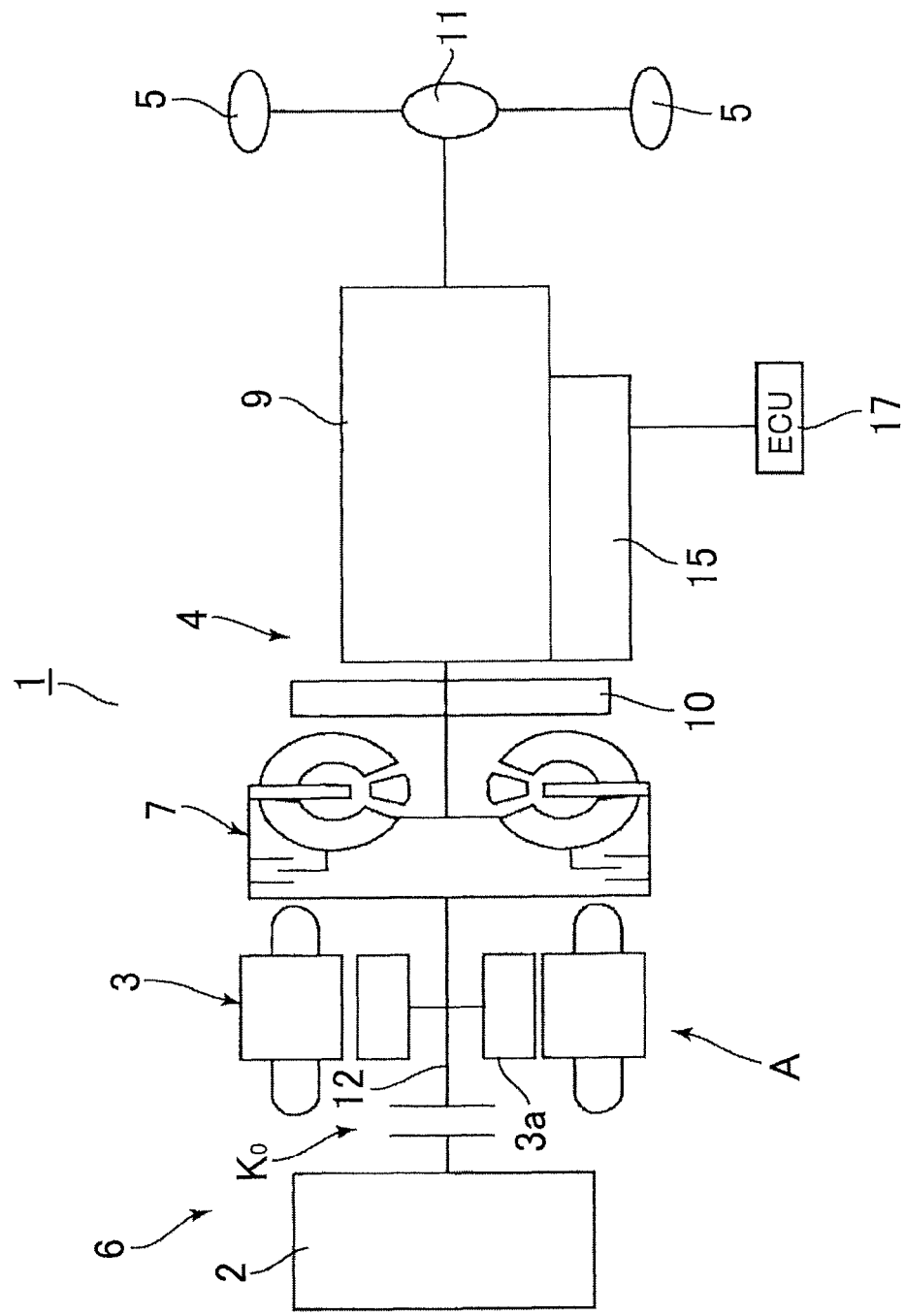
FIG. 1 is a schematic diagram showing a hybrid drive device according to a first embodiment of the present invention.

As shown in FIG. 1, a one-motor hybrid drive device 1 of a front-engine rear-drive (FR) type includes an engine (for example, gasoline engine) 2 disposed with its crankshaft oriented in the front-rear direction of a vehicle when the engine 2 is mounted on the vehicle, and also includes a motor 3, an automatic transmission 4, and drive wheels 5 (in the embodiment, rear wheels) disposed sequentially in this order from an engine side of the hybrid drive device 1 in the axial direction of the engine 2.

Specifically, in the hybrid drive device 1, the engine 2 and the motor 3, which is provided on a drive wheel side with respect to the engine 2, form a drive section 6. The automatic transmission 4 includes a torque converter 7 and an automatic speed change mechanism 9 formed from a plurality of planetary gear sets. A mechanical oil pump 10 is interposed between the torque converter 7 and the automatic speed change mechanism 9. An input shaft of the oil pump 10 is coupled to a turbine runner of the torque converter 7.

Therefore, when power is output from the drive section 6, the power is amplified in torque by the torque converter 7, changed in speed by the automatic speed change mechanism 9, and then output to the left and right rear wheels 5 via a differential device 11. The oil pump 10 rotates together with the torque converter 7 to generate a hydraulic pressure.

The hybrid drive device 1 supports EV travel in which the vehicle is driven by only the motor 3, and energy regeneration in which a rotor $3a$ of the motor 3 is rotated by kinetic energy of the vehicle. In EV travel and energy regeneration, if the engine 2 and the motor 3 are coupled to each other via an output shaft 12 of the drive section 6, the engine 2 is rotated in an accompanying manner via the output shaft 12 to generate a load on the output shaft 12. Therefore, the drive section 6 is configured such that a clutch (hereinafter referred to as "drive section clutch") $K_0$ is interposed on the output shaft 12 between the engine 2 and the motor 3. The drive section clutch $K_0$ is controlled by a hydraulic control device 15 for the hybrid drive device 1 to be discussed in detail later, which enables and disables power transfer between the engine 2 and the motor 3.

Consequently, during EV travel and during regeneration, the drive section clutch $K_0$ which is disposed on a power transfer path between the engine 2 and the motor 3 provided on the drive wheel side with respect to the engine 2 is disengaged to decouple the engine 2 from a power transfer system A on the drive wheel side with respect to the engine 2, which allows efficient EV travel and regeneration without allowing the engine 2 to be rotated in an accompanying manner. In addition, the drive section clutch $K_0$ is disengaged to stop the engine 2 in order to stop the vehicle, and the drive section clutch $K_0$ is engaged to start the engine 2 by means of the motor 3 in order to start the vehicle, which efficiently achieves idling stop.

[Configuration of Hydraulic Control Device for Hybrid Drive Device]

The drive section clutch $K_0$ discussed above is formed from a clutch that is engaged with a piston (not shown) moved when an engagement pressure $P_E$ is supplied to a hydraulic servo 16 (see FIG. 2), and that is disengaged by the urging force of a return spring (not shown) when the engagement pressure $P_E$ is discharged. The hydraulic control device 15 for the hybrid drive device 1 which controls whether or not the engagement pressure $P_E$ is output to the drive section clutch $K_0$ is formed by fitting a plurality of valves into a valve body provided at the bottom portion of the automatic speed change mechanism 9 and by forming a hydraulic circuit in the valve body, and controlled by an electric control unit (ECU) 17.

Figure 2:
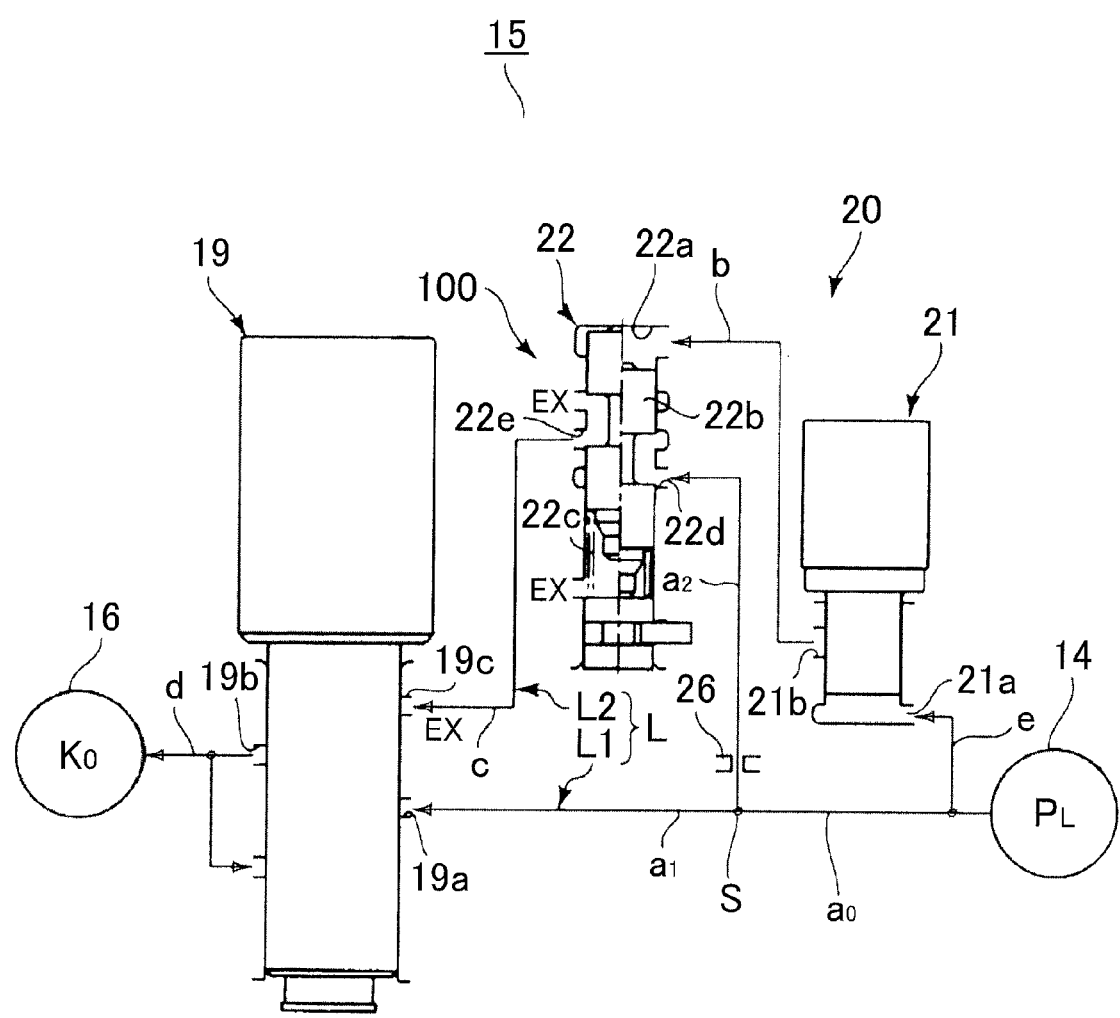
FIG. 2 is a circuit diagram of a hydraulic control device for the hybrid drive device according to the first embodiment of the present invention.

As shown in FIG. 2, a portion of the hydraulic control device 15 that controls the drive section clutch $K_0$ includes a control solenoid valve 19 formed from a normally closed linear solenoid valve that is brought into a non-output state (a state in which communication between an input port and an output port is blocked) when de-energized. The control solenoid valve 19 is electrically controlled by the ECU 17 so as to control whether or not the engagement pressure $P_E$ is output to the hydraulic servo 16 for the drive section clutch $K_0$.

Specifically, the control solenoid valve 19 includes an input port $19a$ to which a line pressure $P_L$ regulated by a source pressure generation section 14 that generates a source pressure is input via oil passages $a_0$ and $a_1$, an output port $19b$ connected to the hydraulic servo 16 for the drive section clutch $K_0$ via an oil passage d, and a drain port $19c$ to be communicated with the output port $19b$ in the non-output state. To engage the drive section clutch $K_0$, the control solenoid valve 19 is energized to allow communication between the input port $19a$ and the output port $19b$ to output the engagement pressure $P_E$ from the output port $19b$ to the hydraulic servo 16 for the drive section clutch $K_0$. To disengage the drive section clutch $K_0$, meanwhile, the control solenoid valve 19 is de-energized to allow communication between the output port 19b and the drain port 19c to communicate the hydraulic servo 16 for the drive section clutch $K_0$ with the drain port 19c. The source pressure generation section 14 regulates a hydraulic pressure generated by the oil pump 10 to generate a source pressure of the engagement pressure $P_E$ for the drive section clutch $K_0$. In the embodiment, the source pressure generation section 14 is formed from a regulator valve that generates the line pressure $P_L$. In the case where the drive section clutch $K_0$ is engaged using a secondary pressure as the source pressure, the source pressure generation section may be formed from a primary regulator valve and a secondary regulator valve.

The control solenoid valve 19 is of a normally closed type. Therefore, the drive section clutch $K_0$ may not be engaged in the case where a transition is made into an all-off mode because of occurrence a short circuit, a wire breakage, a breakdown of the ECU, a failure of the automatic transmission, or the like, that is, in the case where a failure in which the control solenoid valve 19 is de-energized (hereinafter simply referred to as "failure" or "all-off failure") occurs. Therefore, in order to achieve limp-home travel, the hydraulic control device 15 includes an input section 20 serving as a hydraulic pressure securing section that secures a failure-time engagement pressure $P_F$ that allows the drive section clutch $K_0$ to be engaged during a failure in which the control solenoid valve 19 is de-energized.

The input section 20 is configured to allow input of the line pressure $P_L$ to the drain port 19c of the control solenoid valve 19 as the source pressure to directly output the line pressure $P_L$ to the hydraulic servo 16 for the drive section clutch $K_0$ as the failure-time engagement pressure $P_F$, and includes an on/off solenoid valve 21 and a relay valve 22.

The on/off solenoid valve 21 is formed from a normally open valve that makes output when de-energized, and includes an input port 21a to which the line pressure $P_L$ is input via the oil passages $a_0$ and e, and an output port 21b connected to an oil chamber 22a of the relay valve 22 via an oil passage b.

The relay valve (switching valve) 22 includes a spool 22b, a spring 22c that urges the spool 22b upward in the drawing, and the oil chamber 22a provided on the opposite of the spool 22b from the spring 22c and communicated with the output port 21b of the solenoid valve 21. The relay valve 22 further includes an input port (second hydraulic passage input port) 22d, an output port (hydraulic servo connection port) 22e, and a drain port EX.

In the relay valve 22, during normal times in which no failure occurs, the spool 22b is moved to the left-half position by the urging force of the spring 22c. Then, the input port 22d to which the line pressure $P_L$ is input via the oil passages $a_0$ and $a_2$ is blocked. In addition, the output port 22e connected to the drain port 19c of the control solenoid valve 19 via an oil passage c and the drain port EX are communicated with each other. This allows a hydraulic pressure in the hydraulic servo 16 for the drive section clutch $K_0$ to be drained from the drain port EX when the control solenoid valve 19 is de-energized.

In the all-off mode, on the other hand, a signal pressure $P_1$ from the normally open solenoid valve 21 is input to the oil chamber 22a via the oil passage b to move the spool 22b to the right-half position. Then, the input port 22d and the output port 22e are communicated with each other, and the line pressure $P_L$ is output from the output port 22e to the drain port 19c of the control solenoid valve 19 via the oil passage c. Then, the line pressure $P_L$ input to the drain port 19c is output from the output port 19b of the control solenoid valve 19 to the hydraulic servo 16 for the drive section clutch $K_0$ as the failure-time engagement pressure $P_F$.

[Configuration of Hydraulic Passages]

Next, the configuration of hydraulic passages of the hydraulic control device 15 will be described in detail with reference to FIG. 2. The term "hydraulic passage" means a passage to which a hydraulic pressure is supplied, and has the same meaning as "oil passage" and "hydraulic circuit".

The hydraulic control device 15 includes a first hydraulic passage L1 to be used during normal times as a hydraulic passage L provided between the source pressure generation section 14 which supplies the engagement pressure $P_E$ and the hydraulic servo 16, and a second hydraulic passage L2 to be used during an all-off failure in which the control solenoid valve 19 is de-energized.

The second hydraulic passage L2 is configured to allow communication between the source pressure generation section 14 and the hydraulic servo 16 for the drive section clutch $K_0$ during an all-off failure to supply the line pressure $P_L$ to the hydraulic servo 16 for the drive section clutch $K_0$ as the engagement pressure. Specifically, the second hydraulic passage L2 includes the common hydraulic passage $a_0$ connected to the source pressure generation section 14, the connection passage (second connection passage) $a_2$ which connects between a branch portion S, at which the common hydraulic passage $a_0$ is branched into the first and second hydraulic passages L1 and L2, and the input port (second hydraulic passage input port) 22d of the relay valve 22, the drain passage c which connects between the output port (hydraulic servo connection port) 22e of the relay valve 22 and the drain port 19c of the control solenoid valve 19, and the input passage d which connects between the output port 19b of the control solenoid valve 19 and the hydraulic servo 16 for the drive section clutch $K_0$.

On the other hand, the first hydraulic passage L1 is connected to the control solenoid valve 19, and configured to allow communication between the source pressure generation section 14 and the hydraulic servo 16 for the drive section clutch $K_0$ during normal times to supply the engagement pressure $P_E$ regulated by the control solenoid valve 19 to the hydraulic servo 16 for the drive section clutch $K_0$. Specifically, the first hydraulic passage L1 includes the common hydraulic passage $a_0$, the connection passage (first connection passage) $a_1$ which connects between the branch portion S and the input port 19a of the control solenoid valve 19, and the input passage d.

The engagement pressure $P_E$ is supplied to the hydraulic servo 16 for the drive section clutch $K_0$ inevitably through one of the first and second hydraulic passages L1 and L2, and switching is made between the first and second hydraulic passages L1 and L2 by the control solenoid valve 19 and the relay valve 22.

That is, during normal times, communication between the input port 22d and the output port 22e of the relay valve 22 is blocked to block the second hydraulic passage L2, and the engagement pressure $P_E$ is supplied to the hydraulic servo 16 for the drive section clutch $K_0$ through the first hydraulic passage L1. That is, during normal times, the line pressure $P_L$ regulated by the source pressure generation section 14 is input to the input port 19a of the control solenoid valve 19 via the common hydraulic passage $a_0$ and the connection passage $a_1$, and regulated by the control solenoid valve 19. Then, the regulated line pressure $P_L$ is output from the output port 19b of the control solenoid valve 19 to the input passage d, and supplied to the hydraulic servo 16 for the drive section clutch $K_0$.

During an all-off failure, on the other hand, communication between the input port 19a and the output port 19b of the normally closed control solenoid valve 19 is blocked to block the first hydraulic passage L1. In addition, communication between the input port 22d and the output port 22e of the relay valve 22 is allowed to allow communication through the second hydraulic passage L2, and the engagement pressure $P_E$ is supplied to the hydraulic servo 16 for the drive section clutch $K_0$ through the second hydraulic passage L2. That is, during an all-off failure, the line pressure $P_L$ regulated by the source pressure generation section 14 is input to the input port 22d of the relay valve 22 via the common hydraulic passage $a_0$ and the connection passage $a_2$, and to the drain port 19c of the control solenoid valve 19 via the output port 22e of the relay valve 22 and the drain passage c. Then, the input line pressure $P_L$ is not regulated by the control solenoid valve 19, but directly output from the output port 19b of the control solenoid valve 19, and supplied to the hydraulic servo 16 for the drive section clutch $K_0$ as the failure-time engagement pressure $P_F$.

[Configuration of Hydraulic Pressure Adjustment Section]

In this way, during an all-off failure, the line pressure $P_L$ (failure-time engagement pressure $P_F$) is directly supplied to the hydraulic servo 16 for the drive section clutch $K_0$ via the second hydraulic passage L2. Therefore, the line pressure $P_L$ which has not been regulated is directly input to the hydraulic servo 16 to abruptly increase the engagement pressure $P_E$, which may result in abrupt engagement of the drive section clutch $K_0$.

Thus, in order to prevent abrupt engagement of the drive section clutch $K_0$, the hydraulic control device 15 includes a hydraulic pressure adjustment section that restricts the flow rate of oil in the second hydraulic passage L2 or absorbs a hydraulic pressure in the second hydraulic passage L2 to relieve a rise in the engagement pressure $P_F$ during clutch engagement during a failure. Specifically, in the embodiment, the hydraulic pressure adjustment section is formed from an orifice 26 that restricts the flow rate of oil in the second hydraulic passage L2.

Here, in the case where the drive section clutch $K_0$ which has been disengaged is to be engaged, the state of the drive section clutch $K_0$ is varied from a play elimination phase in which the piston is moved to perform play elimination to a power transfer phase in which friction plates are pressed against each other with a clearance reduced so that the drive section clutch $K_0$ transfers power while rotating in a slipping manner, and to a complete engagement phase in which the drive section clutch $K_0$ is completely engaged with almost no difference in rotation between the friction plates. In this event, during normal times, the engagement pressure $P_E$ supplied to the hydraulic servo 16 is kept relatively low in the play elimination phase in which the piston is movable, raised at a predetermined gradient in the power transfer phase, and raised steeply in the complete engagement phase.

If the line pressure $P_L$ which has not been regulated at all is supplied as the engagement pressure $P_E$, on the other hand, the engagement pressure $P_E$ is steeply raised toward the line pressure $P_L$ when the play elimination phase is finished and the power transfer phase is entered, because oil is output such that the engagement pressure $P_E$ is always maximum.

When the power transfer phase is entered, the piston is hardly moved, and therefore the flow of oil in the second hydraulic passage L2 also becomes less. However, there is a minute flow due to factors such as an oil leakage from the control solenoid valve 19 or the switching valve 22 and minute compression of oil.

The diameter of the orifice 26 is set so as to restrict such a minute flow in the second hydraulic passage L2 and relieve a rise in engagement pressure $P_E$ in the power transfer phase. More preferably, the diameter of the orifice 26 is set such that relief of a rise in engagement pressure $P_E$ in the power transfer phase is started in consideration of the time of engagement of the drive section clutch $K_0$.

In addition, the orifice 26 is disposed at a position at which engagement and disengagement operation of the drive section clutch $K_0$ is not affected during normal times. Specifically, the orifice 26 is disposed on the second hydraulic passage L2 and between the branch portion S and the relay valve 22, that is, on the second connection passage $a_2$.

In this way, the second hydraulic passage L2, which allows communication between the source pressure generation section 14 and the hydraulic servo 16 during an all-off failure, is set to have a high conduit resistance compared to that of the first hydraulic passage L1, which allows communication between the source pressure generation section 14 and the hydraulic servo 16 during normal times, with the orifice (hydraulic pressure adjustment section) 26 provided on the connection passage (second connection passage) $a_2$. The hydraulic control device 15 uses the first hydraulic passage L1, which has a low conduit resistance and a good hydraulic pressure response, and the second hydraulic passage L2, which has a high conduit resistance and thus does not cause a steep rise in engagement pressure, as the hydraulic passage L during normal times and during a failure in which the control solenoid valve is de-energized.

That is, the relay valve 22 supplies the engagement pressure $P_E$ through the first hydraulic passage L1 during normal times to bring the hydraulic passage L into a first state, and supplies the engagement pressure (failure-time engagement pressure $P_F$) $P_E$ through the second hydraulic passage during an all-off failure to bring the hydraulic passage L into a second state in which the conduit resistance is higher than that in the first state at least until the clutch $K_0$ is engaged.

That is, in the hydraulic control device 15, the relay valve (switching valve) 22 and the orifice (hydraulic pressure adjustment section) 26 form a switching section 100 that switches the hydraulic passage L into the first state during normal times and into the second state during a failure. Therefore, even if an all-off failure occurs during EV travel, the second hydraulic passage L2 allows communication between the source pressure generation section 14 and the hydraulic servo 16 for the drive section clutch $K_0$ to enable supply of the engagement pressure $P_E$ to the hydraulic servo 16. In this event, in addition, for the line pressure $P_L$ regulated by the source pressure generation section 14, the amount of oil that flows from the common hydraulic passage $a_0$ is restricted by the orifice 26 on the connection passage $a_2$. This makes it possible to suppress a rise in engagement pressure $P_E$ during clutch engagement, thereby suppressing occurrence of an engagement shock due to abrupt engagement of the drive section clutch $K_0$. Thus, deceleration G that acts on the vehicle can be relieved to alleviate an uncomfortable feeling given to the driver. Moreover, with the orifice 26 forming the hydraulic pressure adjustment section, an engagement shock caused by the drive section clutch $K_0$ during a failure can be reduced with a simple and compact configuration.

Further, during normal times, the orifice 26, which is provided on the connection passage $a_2$ between the branch portion S and the switching valve 22, does not affect the flow of oil in the connection passage $a_1$ input to the input port 19a of the control solenoid valve 19, and therefore does not affect supply of the engagement pressure $P_E$ from the control solenoid valve 19 to the hydraulic servo 16. The orifice 26 also does not affect drainage of a hydraulic pressure from the hydraulic servo 16, and thus the drive section clutch $K_0$ can be controlled at a high response speed during normal times.

Second Embodiment

Next, a second embodiment of the present invention will be described. The second embodiment is different from the first embodiment in that a relay valve 40 is disposed downstream of the control solenoid valve 19. Components having the same configuration as those of the first embodiment are not described, and components having the same effect and configuration are given the same reference numerals and names as those of the first embodiment.

Figure 3:
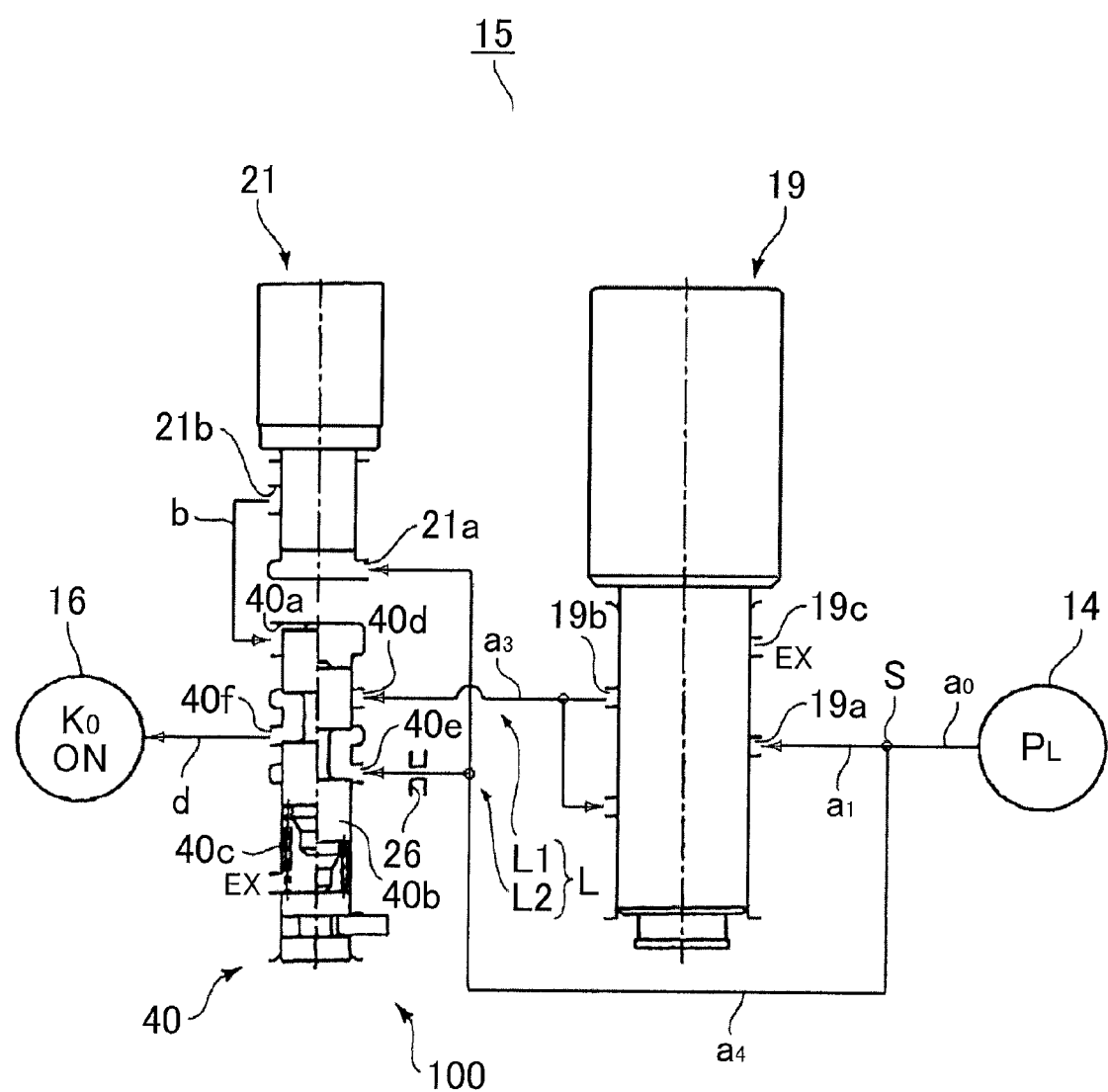
FIG. 3 is a circuit diagram of a hydraulic control device for a hybrid drive device according to a second embodiment of the present invention.

As shown in FIG. 3, the control solenoid valve 19, which controls whether or not the engagement pressure $P_E$ is output to the hydraulic servo 16 for the drive section clutch $K_0$, is of a normally closed type as in the first embodiment, and includes the input port 19a, the output port 19b, and the drain port 19c.

In addition, the relay valve (switching valve) 40 is provided on a hydraulic passage between the control solenoid valve 19 and the hydraulic servo 16 for the clutch $K_0$. The relay valve 40 includes a spool 40b, a spring 40c that urges the spool 40b upward in the drawing, and an oil chamber 40a provided on the opposite side of the spool 40b from the spring 40c to communicate with the output port 21b of the normally open on/off solenoid valve 21. Further, the relay valve 40 includes a first input port (first hydraulic passage input port) 40d connected to the output port 19b of the control solenoid valve 19, a second input port 40e to which the line pressure (source pressure) $P_L$ is directly supplied from the source pressure generation section 14, and an output port (for hydraulic servo connection) 40f connected to the hydraulic servo 16 for the clutch $K_0$.

Here, the second hydraulic passage L2 which supplies the engagement pressure $P_E$ during a failure includes the common hydraulic passage $a_0$, a connection passage (fourth connection passage) $a_4$ that connects between the branch portion S and the second input port 40e of the relay valve 40, and the input passage d.

On the other hand, the first hydraulic passage L1 includes the common hydraulic passage $a_0$, the connection passage $a_1$ (first connection passage) which connects between the branch portion S and the input port 19a of the control solenoid valve 19, a connection passage $a_3$ (third connection passage) that connects between the output port 19b of the control solenoid valve 19 and the first input port 40d of the relay valve 40, and the input passage d which connects between the output port 19b of the control solenoid valve 19 and the hydraulic servo 16 for the clutch $K_0$.

The branch portion S is formed on a hydraulic passage between the source pressure generation section 14 and the control solenoid valve 19. The connection passage $a_4$ is formed to bypass the control solenoid valve 19. In addition, the relay valve 40 allows communication between the first input port 40d and the output port 40f in the case where no failure occurs, and allows communication between the second input port 40e and the output port 40f during an all-off failure. Therefore, even if the control solenoid valve 19 is of a normally closed type, switching can be made between the first and second hydraulic passages L1 and L2 by the relay valve 40 disposed between the control solenoid valve 19 and the hydraulic servo 16, that is, downstream of the control solenoid valve 19.

The orifice 26 serving as the hydraulic pressure adjustment section is disposed on the connection passage as of the second hydraulic passage L2. This makes it possible to suppress a rise in engagement pressure $P_E$ during clutch engagement during an all-off failure, thereby suppressing occurrence of an engagement shock due to abrupt engagement of the drive section clutch $K_0$.

Further, with the orifice 26 disposed on the second hydraulic passage L2 and between the branch portion S and the relay valve 40, it is possible to relieve a rise in engagement pressure during a failure without affecting operation of the hydraulic control device 15 during normal times.

Third Embodiment

Next, a third embodiment of the present invention will be described. The third embodiment is different from the first embodiment in that a control solenoid valve 30 is formed from a normally open valve that outputs the engagement pressure $P_E$ to the hydraulic servo 16 for the drive section clutch $K_0$ when de-energized. Components having the same configuration as those of the first embodiment are not described, and components having the same effect and configuration are given the same reference numerals and names as those of the first embodiment.

Figure 4:
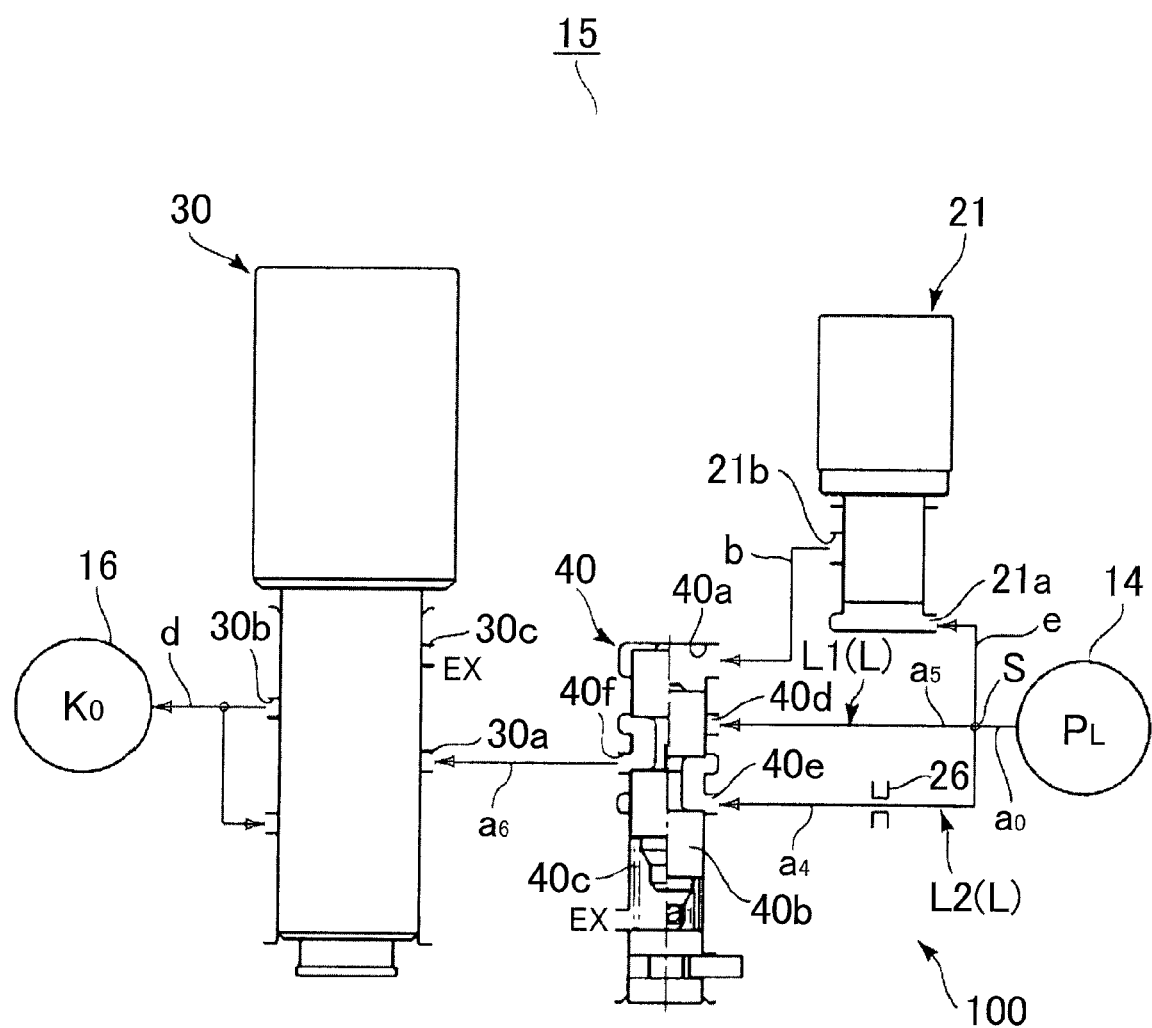
FIG. 4 is a circuit diagram of a hydraulic control device for a hybrid drive device according to a third embodiment of the present invention.

As shown in FIG. 4, the control solenoid valve 30, which controls whether or not the engagement pressure $P_E$ is output to the hydraulic servo 16 for the drive section clutch $K_0$, is formed from a normally open linear solenoid valve in which an input port 30a and an output port 30b are communicated with each other when de-energized.

In addition, the relay valve 40 is provided on a hydraulic passage between the source pressure generation section 14 and the control solenoid valve 30. The relay valve 40 includes the spool 40b, the spring 40c which urges the spool 40b upward in the drawing, and the oil chamber 40a provided on the opposite side of the spool 40b from the spring 40c to communicate with the output port 21b of the normally open on/off solenoid valve 21. Further, the relay valve (switching valve) 40 includes the first and second input ports 40d and 40e to which the line pressure $P_L$ is supplied, and the output port 40f connected to the input port 30a of the control solenoid valve 30.

Here, the second hydraulic passage L2 which supplies the engagement pressure $P_E$ during a failure includes the common hydraulic passage $a_0$, the connection passage (fourth connection passage) $a_4$ which connects between the branch portion S and the second input port (second hydraulic passage input port) 40e of the relay valve 40, a connection passage (sixth connection passage) $a_6$ that connects between the output port (hydraulic servo connection port) 40f of the relay valve 40 and the input port 30a of the control solenoid valve 30, and the input passage d which connects between the output port 30b of the control solenoid valve 30 and the hydraulic servo 16 for the drive section clutch $K_0$. The relay valve 40 is disposed between the source pressure generation section 14 and the control solenoid valve 30, and therefore the branch portion S is formed on a hydraulic passage between the source pressure generation section 14 and the relay valve 40.

On the other hand, the first hydraulic passage L1 which supplies the engagement pressure $P_E$ during normal times includes the common hydraulic passage $a_0$, a connection passage (fifth connection passage) $a_5$ that connects between the branch portion S and the first input port (first hydraulic passage input port) 40d of the relay valve 40, the connection passage $a_6$, and the input passage d.

In the relay valve 40, communication between the first input port 40d and the output port 40f is allowed in the case where no failure occurs, and communication between the second input port 40e and the output port 40f is allowed during an all-off failure. Therefore, the relay valve 40 enables switching between the first and second hydraulic passages L1 and L2 even in the case where the normally open control solenoid valve 30 is used.

The orifice 26 serving as the hydraulic pressure adjustment section is disposed on the connection passage $a_4$ of the second hydraulic passage L2. This makes it possible to suppress a rise in engagement pressure $P_E$ during clutch engagement during an all-off failure, thereby suppressing occurrence of an engagement shock due to abrupt engagement of the drive section clutch $K_0$.

Further, with the orifice 26 disposed on the second hydraulic passage L2 and between the branch portion S and the relay valve 40, it is possible to relieve a rise in engagement pressure during a failure without affecting operation of the hydraulic control device 15 during normal times.

Fourth Embodiment

Next, a fourth embodiment of the present invention will be described. The fourth embodiment is different from the first embodiment in that the control solenoid valve 30 is formed from a normally open valve that outputs the engagement pressure $P_E$ to the hydraulic servo 16 for the drive section clutch $K_0$ when de-energized, and that the relay valve 40 is disposed downstream of the control solenoid valve 30. Components having the same configuration as those of the first embodiment are not described, and components having the same effect and configuration are given the same reference numerals and names as those of the first embodiment.

Figure 5:
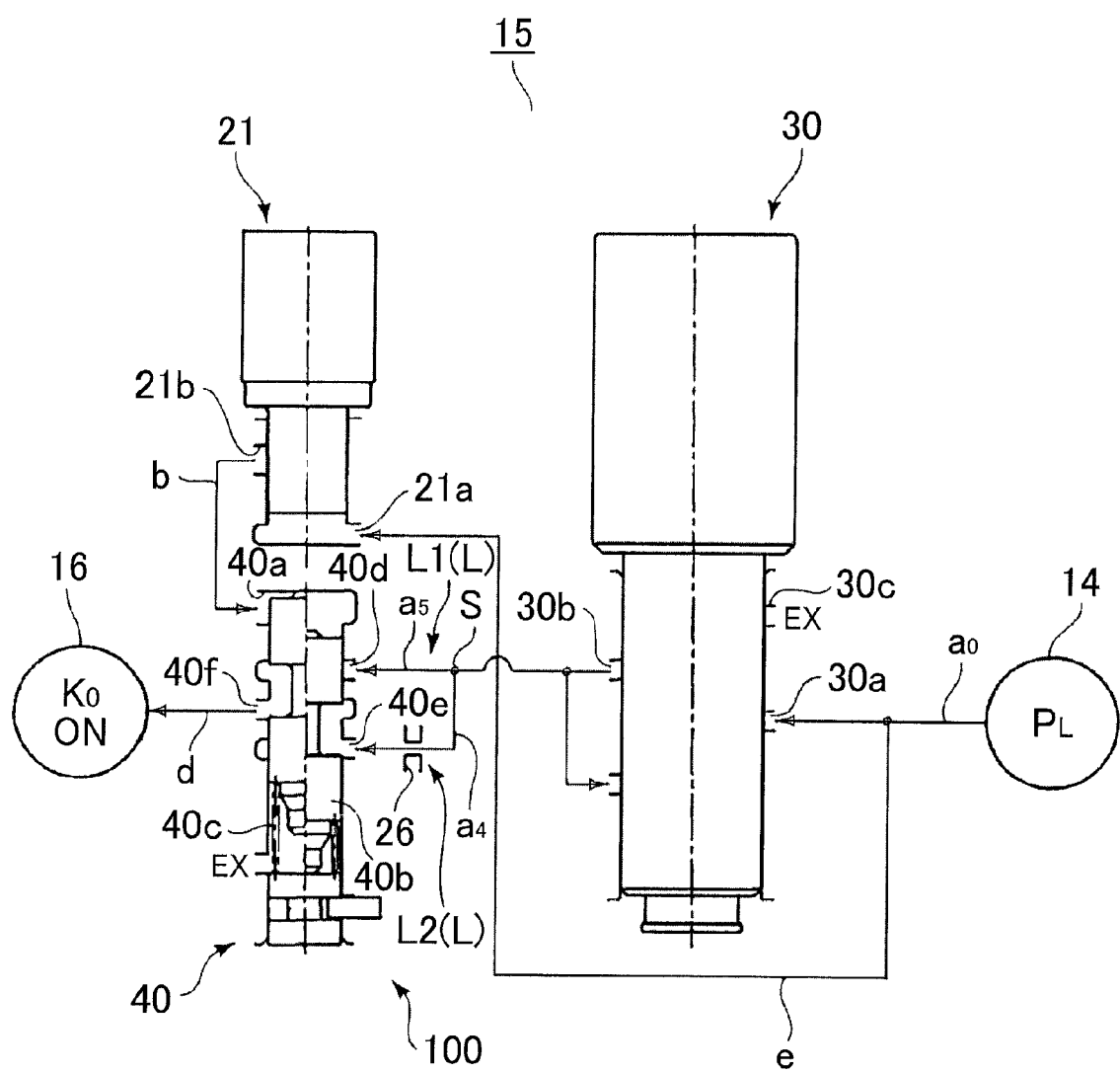
FIG. 5 is a circuit diagram of a hydraulic control device for a hybrid drive device according to a fourth embodiment of the present invention.

As shown in FIG. 5, the control solenoid valve 30, which controls whether or not the engagement pressure $P_E$ is output to the hydraulic servo 16 for the drive section clutch $K_0$, is formed from a normally open linear solenoid valve in which the input port 30*a* and the output port 30*b* are communicated with each other when de-energized.

In addition, the relay valve (switching valve) 40 is provided on a hydraulic passage between the control solenoid valve 30 and the hydraulic servo 16 for the clutch $K_0$. The relay valve 40 includes a spool 40*b*, a spring 40*c* that urges the spool 40*b* upward in the drawing, and the oil chamber 40*a* provided on the opposite side of the spool 40*b* from the spring 40*c* to communicate with the output port 21*b* of the normally open on/off solenoid valve 21. Further, the relay valve 40 includes the first and second input ports (first hydraulic passage input port and second hydraulic passage input port) 40*d* and 40*e* connected to the output port 30*b* of the control solenoid valve 30, and the output port (for hydraulic servo connection) 40*f* connected to the hydraulic servo 16 for the clutch $K_0$.

Here, the second hydraulic passage L2 which supplies the engagement pressure $P_E$ during a failure includes the common hydraulic passage $a_0$, a connection passage (fourth connection passage) $a_4$ that connects between the branch portion S and the second input port 40*e* of the relay valve 40, and the input passage d. The relay valve 40 is disposed between the control solenoid valve 30 and the hydraulic servo 16, and therefore the branch portion S is formed on a hydraulic passage between the control solenoid valve 30 and the relay valve 40.

On the other hand, the first hydraulic passage L1 includes the common hydraulic passage $a_0$, the connection passage (fifth connection passage) $a_5$ which connects between the branch portion S and the first input port 40*d* of the relay valve 40, and the input passage d.

In the relay valve 40, communication between the first input port 40*d* and the output port 40*f* is allowed in the case where no failure occurs, and communication between the second input port 40*e* and the output port 40*f* is allowed during an all-off failure. Therefore, the relay valve 40 enables switching between the first and second hydraulic passages L1 and L2 even in the case where the normally open control solenoid valve 30 is used.

The orifice 26 serving as the hydraulic pressure adjustment section is disposed on the connection passage $a_4$ of the second hydraulic passage L2. This makes it possible to suppress a rise in the engagement pressure $P_E$ during clutch engagement during an all-off failure, thereby suppressing occurrence of an engagement shock due to abrupt engagement of the drive section clutch $K_0$.

Further, with the orifice 26 disposed on the second hydraulic passage L2 and between the branch portion S and the relay valve 40, it is possible to relieve a rise in engagement pressure during a failure without affecting operation of the hydraulic control device 15 during normal times.

In the first to fourth embodiments described above, the orifice 26 is used as the hydraulic pressure adjustment section. However, the hydraulic pressure adjustment section may be any member that functions as a flow rate restriction section that restricts the flow rate of oil, and may be an oil passage with a small diameter, for example. Specifically, in the first embodiment, the connection passage $a_2$ may be formed to be smaller in diameter than the connection passage $a_1$ to serve as the hydraulic pressure adjustment section. In the second embodiment, the connection passage $a_4$ may be formed to be smaller in diameter than the connection passages $a_1$ and $a_3$ to serve as the hydraulic pressure adjustment section. In the third and fourth embodiments, the connection passage $a_4$ may be formed to be smaller in diameter than the connection passage $a_5$ to serve as the hydraulic pressure adjustment section.

Fifth Embodiment

Next, a fifth embodiment of the present invention will be described. The fifth embodiment is different from the first embodiment in that a damper 25 is used as the hydraulic pressure adjustment section. Components having the same configuration as those of the first embodiment are not described, and components having the same effect and configuration are given the same reference numerals and names as those of the first embodiment.

[Configuration of Damper]

Figure 6:
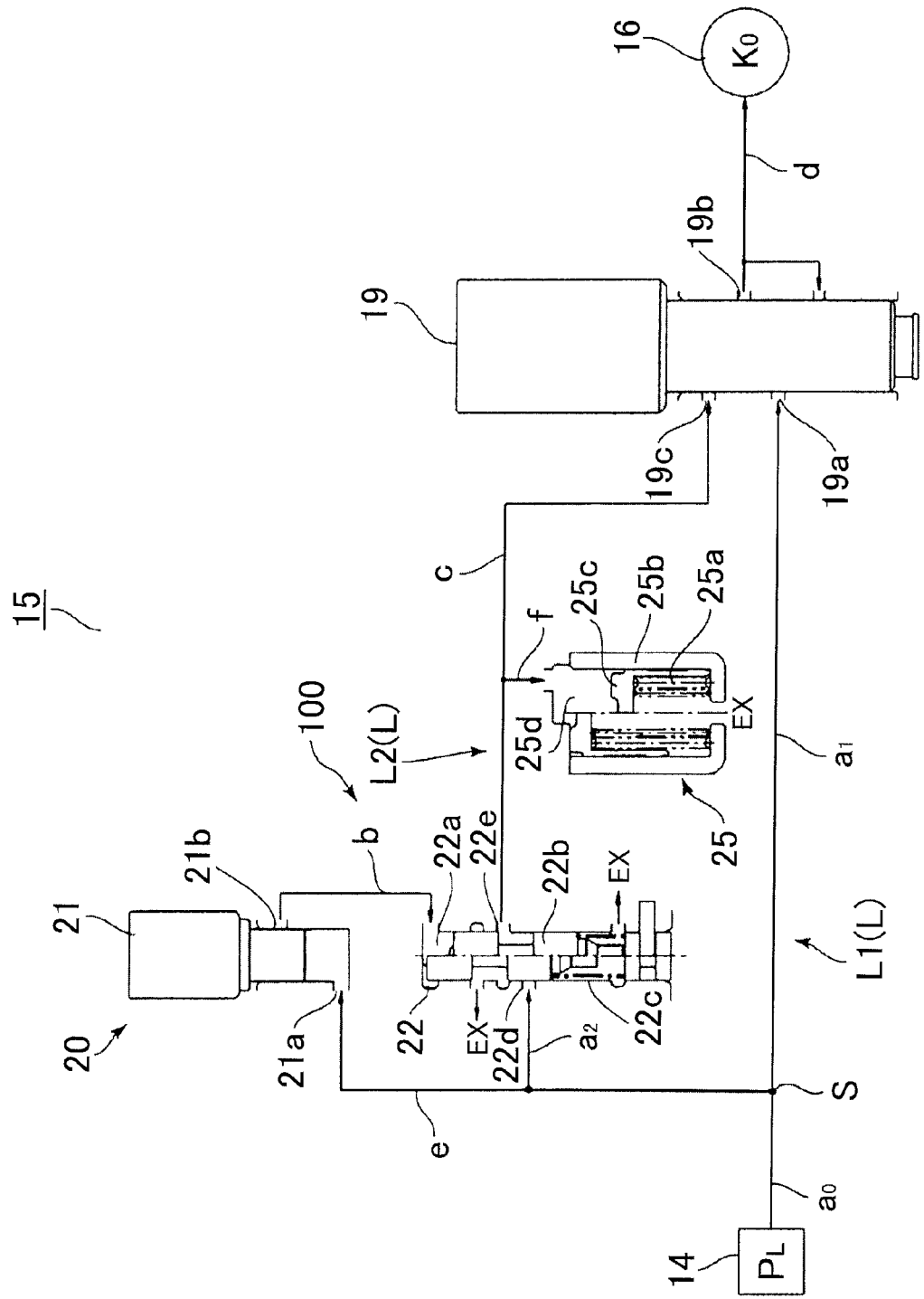
FIG. 6 is a circuit diagram of a hydraulic control device for a hybrid drive device according to a fifth embodiment of the present invention.

In the hydraulic control device 15 according to the fifth embodiment, as shown in FIG. 6, the spring-operated damper 25 serving as the hydraulic pressure adjustment section is connected to the drain passage c, and the switching section 100 is formed from the damper 25 and the relay valve 22. The failure-time engagement pressure $P_F$ is temporarily absorbed by the damper 25, and slowly supplied to the hydraulic servo 16 for the drive section clutch $K_0$. That is, the damper 25 is connected to the second hydraulic passage L2 to increase the conduit resistance of the second hydraulic passage L2 compared to that of the first hydraulic passage L1 at least until the drive section clutch $K_0$ is engaged.

The damper 25 includes a case 25*b*, a piston 25*c* disposed inside the case 25*b*, a spring 25*a* that urges the piston 25*c*, and an oil chamber 25*d* formed between the case 25*b* and the piston 25*c*. The damper 25 has a damper capacity X that allows absorption of a hydraulic pressure that causes the drive section clutch $K_0$ to generate a torque capacity $T_C$ at which the engine 2 starts rotating for the line pressure (failure-time engagement pressure $P_F$) to be supplied to the hydraulic servo 16 for the drive section clutch $K_0$ in the all-off mode.

That is, the damper capacity X is a spring load $P_{SE}$ received by the spring 25a at a stroke end $L_E$ of the damper 25. As shown in FIG. 7, the spring load $P_{SE}$ at the stroke end $L_E$ is set to a value corresponding to friction torque caused in the drive section clutch $K_0$ at a prescribed maximum rotational speed (rev limit) of the engine 2.

To be more specific, torque caused in the drive section clutch $K_0$ in a situation where the engine 2 is making no output and the engine 2 may be rotated in an accompanying manner is friction torque. The friction torque is proportional to the rotational speed of the shaft (clutch), and therefore is highest, at the torque capacity $T_C$ of the clutch required for the drive section clutch $K_0$, in the case where the engine 2 is rotated at the prescribed maximum rotational speed. In order to be able to absorb a hydraulic pressure $P_{BASE}$ at which the drive section clutch $K_0$ may be engaged without slipping even if the friction torque is input to the drive section clutch $K_0$ when the vehicle is traveling in any rotational speed range, the damper 25 has the damper capacity X which allows absorption of the hydraulic pressure $P_{BASE}$ corresponding to the torque capacity $T_C$ of the clutch required to keep the drive section clutch $K_0$ engaged without slipping when the engine 2 is rotated at the prescribed maximum rotational speed. In other words, the damper 25 has the damper capacity X which enables absorption of the hydraulic pressure $P_{BASE}$ which causes the drive section clutch $K_0$ to generate the torque capacity $T_C$ corresponding to the friction torque at a predetermined rotational speed of the engine 2.

That is, even if an all-off failure occurs and the drive section clutch $K_0$ is engaged during EV travel and during regeneration at any vehicle speed, the damper 25 can absorb, of all the line pressure $P_L$ serving as the failure-time engagement pressure $P_F$, at least the hydraulic pressure $P_{BASE}$ corresponding to the torque capacity at least required for the drive section clutch $K_0$ to rotate the engine 2.

Figure 8:
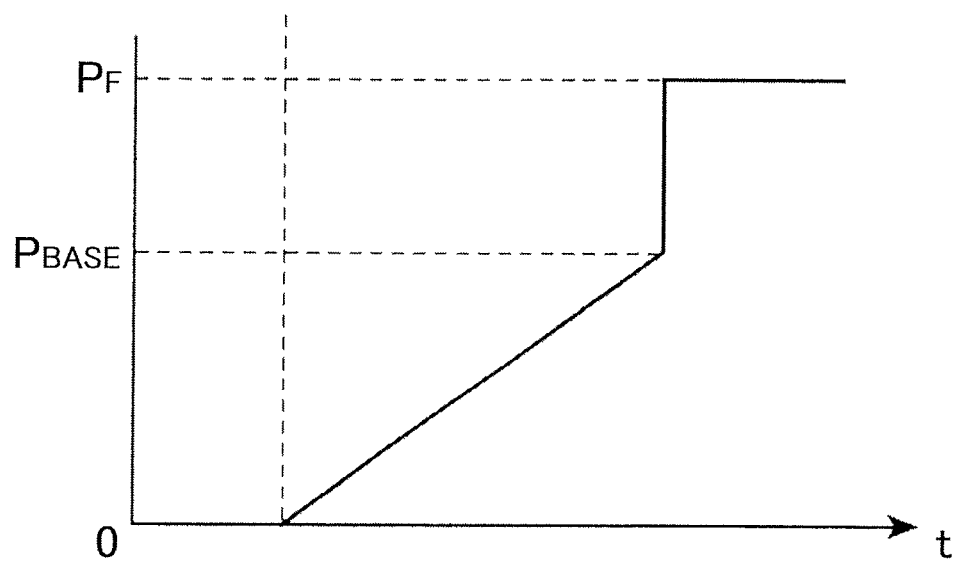
FIG. 8 is a graph showing the hydraulic pressure of a drive section clutch during an all-off failure.

Consequently, as shown in FIG. 8, even if the all-off mode is entered and the line pressure $P_L$ (failure-time engagement pressure $P_F$) is output from the output port 22e of the relay valve 22 to the hydraulic servo 16 for the drive section clutch $K_0$ via the drain port 19c of the control solenoid valve 19, a pressure that becomes gradually higher is output to the hydraulic servo 16 for the drive section clutch $K_0$ until the hydraulic pressure $P_{BASE}$ corresponding to a clutch capacity V required to keep the drive section clutch $K_0$ engaged without slipping for friction torque of the engine 2 input to the drive section clutch $K_0$. This is achieved because the damper 25, which is connected via an oil passage f to the oil passage c which connects between the output port 22e of the relay valve 22 and the drain port 19c of the control solenoid valve 19, temporarily absorbs the pressure. The hydraulic pressure is steeply raised from the hydraulic pressure $P_{BASE}$ corresponding to the clutch capacity V to the line pressure $P_L$ (failure-time engagement pressure $P_F$). However, the drive section clutch $K_0$ has already been engaged, and therefore such a steep rise does not directly involve an engagement shock and does not give the driver an uncomfortable feeling.

That is, even during an all-off failure, a hydraulic pressure is abruptly supplied to the drive section clutch $K_0$ when the difference in rotational speed between the engine 2 and the output shaft 12 is large before the drive section clutch $K_0$ is subjected to complete engagement control. Then, the drive section clutch $K_0$ is engaged slowly, rather than abruptly, and the output shaft 12 is not subjected to a load due to abrupt accompanying rotation of the engine even during EV travel and during regeneration, for example. Therefore, little engagement shock is caused, and the drive section clutch $K_0$ can be engaged without giving the driver an uncomfortable feeling.

On the other hand, the drive section clutch $K_0$ needs to be engaged in order that the engine 2 is started when the vehicle is started, and needs to be switched between the engaged state and the disengaged state in accordance with an accelerator operation by the operator during travel. Therefore, if the speed of response of the drive section clutch $K_0$ to switching between the engaged state and the disengaged state is low, there may be a deviation between the operation by the driver and the behavior of the vehicle to give the driver an uncomfortable feeling.

Hence, it is necessary for the drive section clutch $K_0$ to have a very high response speed compared to other clutches. However, the damper 25 for use in the all-off mode is provided on the oil passage c which is used as a drain passage during normal times, and therefore does not absorb the engagement pressure $P_E$ to be output to the hydraulic servo 16 for the drive section clutch $K_0$ during normal times. In addition, during normal times, the output port 22e of the relay valve 22 is communicated with the drain port EX which is open to the atmosphere, and therefore no pressure is generated in the oil passage c. Thus, the damper 25 is moved to the left-half position by the urging force of the spring 25a, and does not affect oil drained from the oil passage c at all.

Therefore, during normal times, the engagement pressure $P_E$ can be quickly output to the hydraulic servo 16 for the drive section clutch $K_0$, and the damper 25 does not hinder discharge of a hydraulic pressure from the hydraulic servo 16 for the drive section clutch $K_0$. Therefore, the drive section clutch $K_0$ can be controlled at a high response speed.

In the embodiment discussed above, the damper capacity X, that is, the spring load $P_{SE}$ at the stroke end $L_E$ of the spring 25a, is set in accordance with friction torque of the engine 2. However, the present invention is not limited thereto, and the damper capacity X (spring load $P_{SE}$) may be set in accordance with friction torque of the engine 2 at a predetermined engine speed such as a rotational speed that is most frequently used during travel of the vehicle.

Sixth Embodiment

Next, a sixth embodiment of the present invention will be described. The sixth embodiment is different from the second embodiment in that the damper 25 according to the fifth embodiment is used as the hydraulic pressure adjustment section and that the damper 25 is disposed between the control solenoid valve 30 and the hydraulic servo 16. Components having the same configuration as those of the second embodiment are not described, and components having the same effect and configuration are given the same reference numerals and names as those of the second embodiment.

Figure 9:
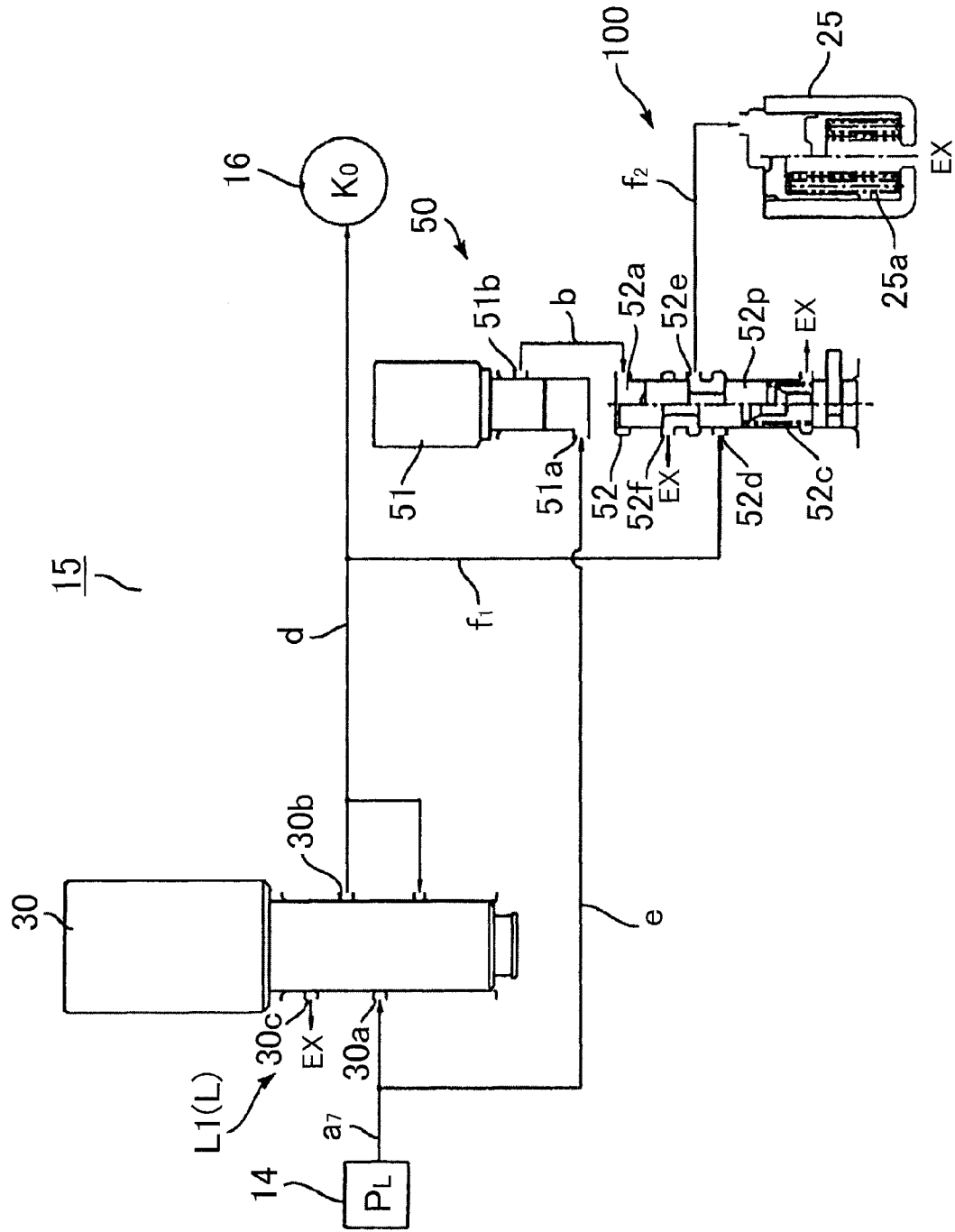
FIG. 9 is a circuit diagram of a hydraulic control device for a hybrid drive device according to a sixth embodiment of the present invention.
Figure 10:
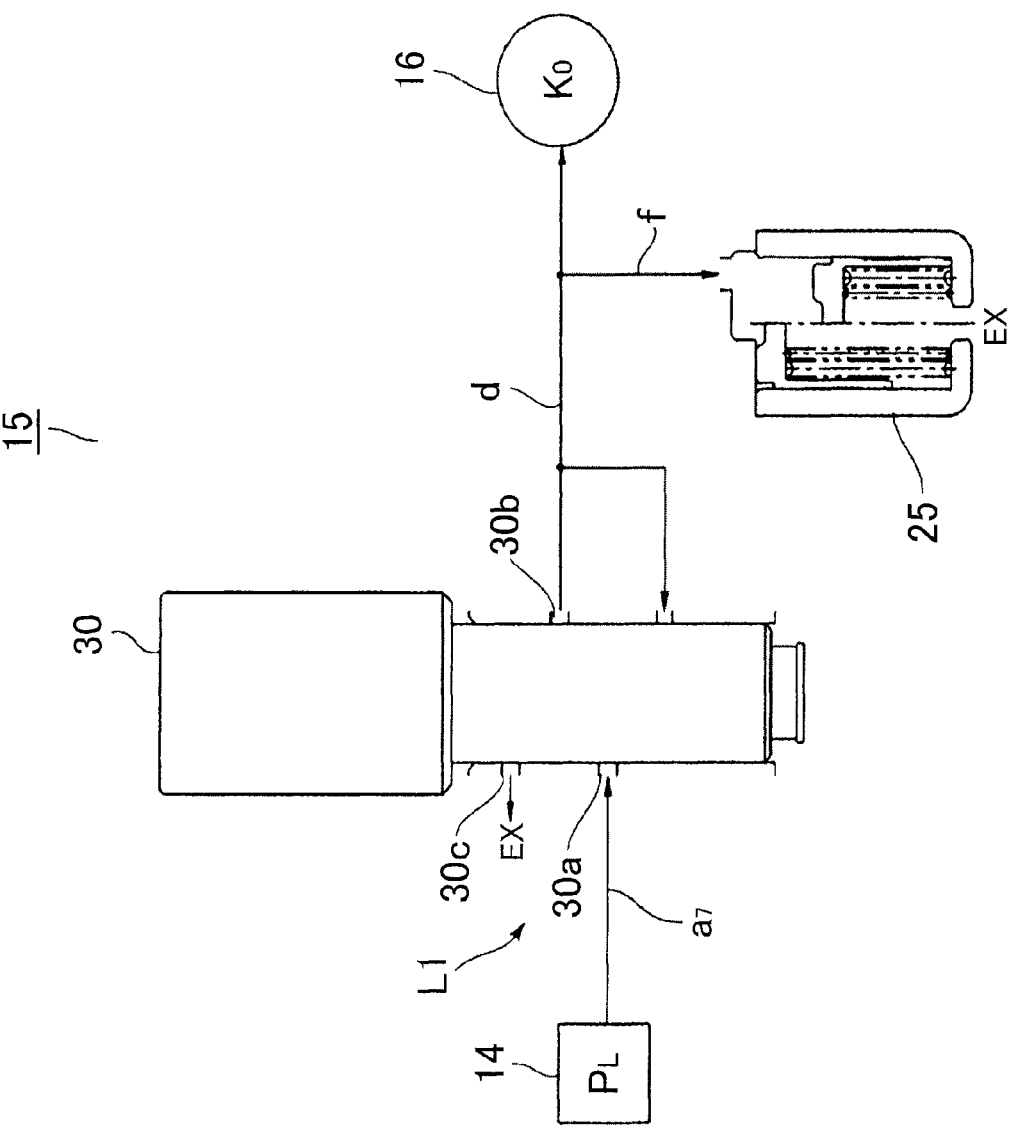
FIG. 10 is a circuit diagram of a hydraulic control device for a hybrid drive device according to a reference example of the present invention.

As shown in FIG. 9, the control solenoid valve 30, which controls whether or not the engagement pressure $P_E$ is output to the hydraulic servo 16 for the drive section clutch $K_0$, is formed from a normally open linear solenoid valve in which the input port 30a and the output port 30b are communicated with each other when de-energized. Therefore, during an all-off failure, the input port 30a and the output port 30b of the control solenoid valve 30 are communicated with each other, and the control solenoid valve 30 outputs the line pressure $P_L$, which has been input via a connection passage (seventh connection passage) $a_7$ that connects between the source pressure generation section 14 and the input port 30a of the control solenoid valve 30, from the output port 30b to the hydraulic servo 16 for the drive section clutch $K_0$ as the failure-time engagement pressure $P_F$.

In addition, the damper 25 is connected via oil passages (communication passages) $f_1$ and $f_2$ to the oil passage (input passage) d which connects between the control solenoid valve 30 and the hydraulic servo 16 for the drive section clutch $K_0$. In other words, the damper 25 is connected to the input passage d, which extends between the output port 30b of the control solenoid valve 30 and the hydraulic servo 16 for the drive section clutch $K_0$, by the communication passages $f_1$ and $f_2$ which connect between the damper 25 and the input passage d.

A blocking section 50 capable of allowing and blocking connection between the damper 25 and the oil passage d is interposed between the oil passages $f_1$ and $f_2$. The blocking section 50 includes a solenoid valve 51 and a relay valve (blocking valve) 52. The solenoid valve 51 is formed from a normally open valve that makes output when de-energized, and includes an input port 51a to which the line pressure $P_L$ is input via the oil passages $a_7$ and e, and an output port 51b connected to an oil chamber 52a of the relay valve 52 via the oil passage b.

The relay valve 52 includes a spool 52p, a spring 52c that urges the spool 52p upward in the drawing, and the oil chamber 52a provided on the opposite side of the spool 52p from the spring 52c and communicated with the output port 51b of the solenoid valve 51. The relay valve 52 further includes an input port 52d, an output port 52e, and a drain port 52f.

In the relay valve 52, during normal times, the spool 52p is moved to the left-half position by the urging force of the spring 52c. Then, communication between the input port 52d, to which the failure-time engagement pressure $P_F$/engagement pressure $P_E$ is input via the oil passage $f_1$, and the output port 52e, which is connected to the damper 25 via the oil passage $f_2$, is blocked. In addition, the output port 52e and the drain port 52f are communicated with each other, and a hydraulic pressure in the damper 25 is drained from the drain port 52f.

In the all-off mode, further, a signal pressure $P_2$ from the normally open solenoid valve 51 is input to the oil chamber 52a via the oil passage b to move the spool 52p to the right-half position. Then, the input port 52d and the output port 52e are communicated with each other, and the damper 25 is communicated with the oil passage d, which is connected to the hydraulic servo 16 for the drive section clutch $K_0$, via the oil passages $f_1$ and $f_2$.

Consequently, during normal times, communication between the damper 25 and the oil passage d, which is connected to the hydraulic servo 16 for the drive section clutch $K_0$, is blocked by the relay valve 52 serving as the blocking valve. Therefore, even if the engagement pressure $P_E$ is output from the output port 30b of the control solenoid valve 30 to the hydraulic servo 16 for the drive section clutch $K_0$, the engagement pressure $P_E$ is not temporarily absorbed by the damper 25 as in a hydraulic control device 15 shown in FIG. 10 in which the damper 25 is directly connected to the oil passage d. In addition, as a matter of course, when a hydraulic pressure in the hydraulic servo 16 for the clutch $K_0$ is to be drained during normal times, the damper 25 is blocked from the hydraulic servo 16 for the drive section clutch $K_0$ by the blocking section 50, and therefore does not affect the hydraulic servo 16 at all.

With the damper 25 not affecting the engagement pressure $P_E$ at all during normal times, the drive section clutch $K_0$ can be controlled responsively. In the all-off mode, meanwhile, the damper 25, which has been blocked by the blocking section 50, and the oil passage d are communicated with each other, and therefore the failure-time engagement pressure $P_F$ output from the output port 30b of the control solenoid valve 30 is temporarily absorbed by the damper 25, and slowly output to the hydraulic servo 16 for the drive section clutch $K_0$. Consequently, in the all-off mode, it is possible to prevent abrupt engagement of the hydraulic servo 16 for the drive section clutch $K_0$, and to engage the hydraulic servo 16 for the drive section clutch $K_0$ with little engagement shock. In this way, the switching section 100 can be formed from the damper 25 and the blocking section 50 (blocking valve 52) without separately providing the first hydraulic passage L1 and the second hydraulic passage L2 as the hydraulic passage L.

In the fifth and sixth embodiments, a spring-operated damper is used. However, any type of damper such as a damper that uses a fluid may also be used.

The hybrid drive device 1 is configured such that the drive section clutch $K_0$ is brought into a half-clutch state by the urging force of a weak elastic member in the case where the vehicle is completely stationary and no hydraulic pressure is generated from the oil pump. Further, the hybrid drive device 1 may also include a small electric pump for auxiliary use or a starter for emergency use.

In addition, the automatic transmission is not limited to a multi-speed automatic transmission, and the hybrid drive device 1 may include any type of transmission such as a CVT, or may not include a transmission itself.

Further, it should be understood that the present invention is suitably applied not only to FR vehicles but also to FF vehicles, and the inventions described in relation to the first to third embodiments discussed above may be applied in any combination.

The hydraulic control device for a hybrid drive device according to the present invention can be used for hybrid drive devices to be mounted on passenger cars, trucks, and so forth.

The invention claimed is:

1. A hydraulic control device for a hybrid drive device, comprising:
   a source pressure generation section that generates a source pressure;
   a hydraulic servo for a clutch provided on a power transfer path between an engine and a motor provided on a drive wheel side with respect to the engine;
   a control solenoid valve that is a normally closed linear solenoid valve that includes an input port to which the source pressure is supplied from the source pressure generation section, an output port that is electrically controlled so as to output the regulated source pressure to the hydraulic servo for the clutch as an engagement pressure, and a drain port that discharges hydraulic pressure from the hydraulic servo of the clutch, and that blocks communication between the input port and the output port and allows communication between the drain port and the output port when de-energized;
   a switching section that switches a hydraulic passage, which extends between the source pressure generation section and the hydraulic servo to supply the engagement pressure, between a first state and a second state in which the hydraulic passage has a high conduit resistance compared to that in the first state at least until the clutch is engaged, wherein
   the switching section switches the hydraulic passage into the second state during a failure in which the control solenoid valve is de-energized and the source pressure is directly supplied to the hydraulic servo as the engagement pressure, and switches the hydraulic passage into the first state during normal times when the failure does not occur, and, in the second state, the source pressure input to the drain port of the control solenoid valve is output from the output port to the hydraulic servo as a failure time engagement pressure;

a normally open solenoid valve that makes an output when de-energized, wherein switching between the first state and the second state is performed by a signal pressure from the normally Open solenoid valve; and an orifice that is disposed at a position at which an engagement operation and a disengagement operation of the clutch is not affected during the normal times.

2. The hydraulic control device for a hybrid drive device according to claim 1, wherein:

the hydraulic passage includes a first hydraulic passage that allows communication between the source pressure generation section and the hydraulic servo during the normal times, and a second hydraulic passage that allows communication between the source pressure generation section and the hydraulic servo during the failure; and the switching section includes
a switching valve that switches the hydraulic passage to the first hydraulic passage to establish the first state, and that switches the hydraulic passage to the second hydraulic passage to establish the second state, and
a hydraulic pressure adjustment section that is disposed on the second hydraulic passage and that restricts a flow rate of oil in the second hydraulic passage or absorbs a hydraulic pressure in the second hydraulic passage to relieve a rise in engagement pressure during engagement of the clutch during the failure.

3. The hydraulic control device for a hybrid drive device according to claim 2, wherein the hydraulic pressure adjustment section is a flow rate restriction section that restricts the flow rate of the oil, and is disposed on the second hydraulic passage between a branch portion, at which a common hydraulic passage connected to the source pressure generation section is branched into the first and second hydraulic passages, and the switching valve.

4. The hydraulic control device for a hybrid drive device according to claim 3, wherein:

the switching valve is a valve that includes a hydraulic servo connection port connected to the drain port of the control solenoid valve and a second hydraulic passage input port to which the source pressure is supplied, and that allows communication between the hydraulic servo connection port and the second hydraulic passage input port during the failure and blocks communication between the hydraulic servo connection port and the second hydraulic passage input port during the normal times;

the first hydraulic passage includes the common hydraulic passage, a first connection passage that connects between the branch portion and the input port of the control solenoid valve, and an input passage that connects between the output port of the control solenoid valve and the hydraulic servo for the clutch;

the second hydraulic passage includes the common hydraulic passage, a second connection passage that connects between the branch portion and the second hydraulic passage input port of the switching valve, a drain passage that connects between the hydraulic servo connection port of the switching valve and the drain port of the control solenoid valve, and the input passage; and the flow rate restriction section is an orifice provided on the second connection passage or the second connection passage which is formed to be smaller in diameter than the first connection passage.

5. The hydraulic control device for a hybrid drive device according to claim 3, wherein:

the switching valve is a valve that includes a first hydraulic passage input port connected to the output port of the control solenoid valve, a second hydraulic passage input port to which the source pressure is supplied, and a hydraulic servo connection port connected to the hydraulic servo, and that allows communication between the first hydraulic passage input port and the hydraulic servo connection port during the normal times and blocks communication between the first hydraulic passage input port and the hydraulic servo connection port and allows communication between the second hydraulic passage input port and the hydraulic servo connection port during the failure;

the first hydraulic passage includes the common hydraulic passage, a first connection passage that connects between the branch portion and the input port of the control solenoid valve, a second connection passage that connects between the output port of the control solenoid valve and the first hydraulic passage input port of the switching valve, and an input passage that connects between the output port of the control solenoid valve and the hydraulic servo for the clutch;

the second hydraulic passage includes the common hydraulic passage, a third connection passage that connects between the branch portion and the second hydraulic passage input port of the switching valve, and the input passage; and the flow rate restriction section is an orifice provided on the third connection passage or the third connection passage which is formed to be smaller in diameter than the first or second connection passage.

6. The hydraulic control device for a hybrid drive device according to claim 2, wherein the hydraulic pressure adjustment section is a damper having a damper capacity that enables absorption of a hydraulic pressure that causes the clutch to generate a torque capacity corresponding to friction torque at a predetermined rotational speed of the engine.

7. The hydraulic control device for a hybrid drive device according to claim 6, wherein:

the switching valve is a valve that includes a hydraulic servo connection port connected to the drain port of the control solenoid valve and a second hydraulic passage input port to which the source pressure is supplied, and that allows communication between the hydraulic servo connection port and the second hydraulic passage input port during the failure and blocks communication between the hydraulic servo connection port and the second hydraulic passage input port during the normal times;

the first hydraulic passage includes a common hydraulic passage connected to the source pressure generation section, a first connection passage that connects between a branch portion, at which the common hydraulic passage is branched into the first and second hydraulic passages, and the input port of the control solenoid valve, and an input passage that connects between the output port of the control solenoid valve and the hydraulic servo for the clutch;

the second hydraulic passage includes the common hydraulic passage, a second connection passage that connects between the branch portion and the second hydraulic passage input port of the switching valve, a drain passage that connects between the second hydraulic passage input port of the switching valve and the drain port of the control solenoid valve, and the input passage which connects between the output port of the control solenoid valve and the hydraulic servo for the clutch; and the damper is connected to the drain passage.

8. The hydraulic control device for a hybrid drive device according to claim 6, wherein the predetermined rotational speed of the engine is a prescribed maximum rotational speed of the engine.

9. The hydraulic control device for a hybrid drive device according to claim 7, wherein the predetermined rotational speed of the engine is a prescribed maximum rotational speed of the engine.

* * * * *